United States Patent [19]

Janusas et al.

[11] Patent Number: 5,107,267
[45] Date of Patent: Apr. 21, 1992

[54] COHERENT SAMPLING REPEATER

[75] Inventors: Saulius Janusas, Seacliff; Stephen F. Piper, Centerport, both of N.Y.

[73] Assignee: Grumman Aerospace Corporation, Bethpage, N.Y.

[21] Appl. No.: 666,012

[22] Filed: Mar. 7, 1991

[51] Int. Cl.⁵ ............................................. G01S 7/38
[52] U.S. Cl. ............................................. 342/15
[58] Field of Search ...................... 342/14, 15, 51, 187

[56] References Cited

U.S. PATENT DOCUMENTS

| 2,978,699 | 4/1961 | Dodington | 342/15 |
| 3,720,952 | 3/1973 | Lawsine | 342/15 |
| 3,896,438 | 7/1975 | Schrader, Jr. | 342/15 |
| 3,955,200 | 5/1976 | Miller | 342/15 |
| 4,358,763 | 11/1982 | Strasch | 342/51 |

Primary Examiner—Gilberto Barrón, Jr.
Attorney, Agent, or Firm—Pollock, VandeSande & Priddy

[57] ABSTRACT

A sampling repeater includes a transmit/receive switch for inputting a received RF signal to a delay line. The delayed signal is then scrambled and fed to the transmit/receive switch, which changes its state so as to transmit the scrambled signal with minimal delay. A delay-stabilized oscillator is connected across the delay line and generates a control signal to produce a sampling waveform for the incoming RF signal. This waveform also synchronizes the transmit/receive switch so that the circuit becomes self-synchronized. The end result will be transmission of a scrambled incoming signal which will adversely affect the guidance of an incoming missile being guided with the RF signal simultaneously picked up by the repeater.

5 Claims, 1 Drawing Sheet

COHERENT SAMPLING REPEATER

FIELD OF THE INVENTION

The present invention relates to radio frequency repeaters, and more particularly to a high-speed repeater incorporating a signal scrambler to produce an electrical countermeasure system against hostile RF-guided missiles.

BACKGROUND OF THE INVENTION

Development continues in countermeasures for protecting aircraft from hostile RF-guided missiles. One protective approach is jamming. However, a number of problems are presented by this technique when RF-guided missiles employ a wide spectrum for guidance. Jamming requires substantial power levels to override guidance signals; and since modern guidance systems "hop" between various frequencies in a selected frequency band, the real time jamming of an entire spectrum is necessary. As a result, jamming is spectrum inefficient.

One means for protecting aircraft from hostile RF-guided missiles is the employment of chaff. However, relatively large chaff cartridges must be employed to cover a large space about an aircraft and environmental conditions always present problems for the effectiveness of chaff.

SUMMARY OF THE PRESENT INVENTION

The present invention is directed to a coherent straight-through repeater which may be employed on a decoy capable of providing the best opportunity of protecting aircraft from hostile RF-guided missiles. Straight-through repeaters require simultaneous reception and re-transmission of intercepted threat RF signals. To satisfy this requirement, the isolation between transmitting and receiving antennas must be sufficiently high to prevent the decoy from self-capture and recirculation of its own signals.

The present invention utilizes ultra-high RF sampling rates and multiplexing techniques. State of the art GaAs components are available which can perform these ultra-high speed functions. Because of these techniques, antenna isolation no longer plays a part in the antenna design and total spherical antenna coverage is possible.

The circuitry of the present invention produces sidebands as a result of ultra-high-speed signal repeating but it has been determined that missile electronics do not normally have provisions for detection or reaction to the sidebands produced by the ultra-high-speed repeated signals of the present invention. Thus, in effect, an incoming threatening missile will have its electronics see a pure decoy return and as a result will be effectively decoyed from a host aircraft.

State of the art GaAs technology makes a coherent sampling repeater feasible. The repeater of the present invention is configured to offer the following performance advantages:

a) fast sampling rates on the order of 1 GHz,
b) negligible acquisition time,
c) fully coherent,
d) small size,
e) wide band coverage in the order of octaves,
f) through-put delay on the order of 1 ns, and
g) superior resistance to signal recirculation through a circuit loop.

Compared to a primed oscillator or phase-locked loop non-coherent repeater, the coherent sampling repeater of the present invention requires negligible acquisition time and can therefore handle a wider class of threat waveforms, including FM, chirps, PD, or pulse threats.

The present invention is also effective as a jammer of radio communications as well, such as communication by VHF field radios.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
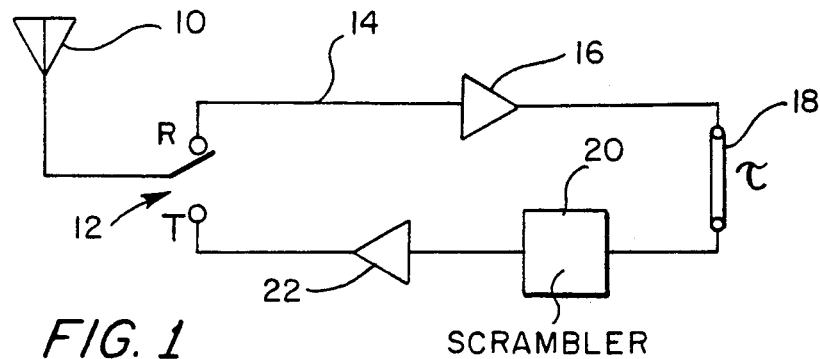
FIG. 1 is a basic block diagram of the present sampling repeater indicating the present concept of the invention.

FIG. 1 illustrates the basic concept of the present sampling repeater. An antenna 10 has its output connected to a transmit/receive (T/R) switch 12 which is capable of operating at 1 GHz. The switch may be viewed as the principal sampling gate for the repeater of the present invention and sets the duty cycle. A received signal exists along line 14 where it is input to a low noise amplifier 16. The output of this amplifier is input to a delay line 18 which achieves a hold operation prior to signal transmission to a scrambler 20. The purpose of the scrambler is to scramble the received signal; and after amplification in power amplifier 22, the scrambled signal is passed through the T/R switch 12 to antenna 10 which transmits the scrambled signal to an incoming R/F guided missile which now receives an original R/F guiding signal from an originating source along with a repeated scrambled signal from the present invention. Thus, in effect, the repeated scrambled signal from the present system prevents the guided missile from accurate guidance on the basis of the source RF signal by itself.

Figure 2:
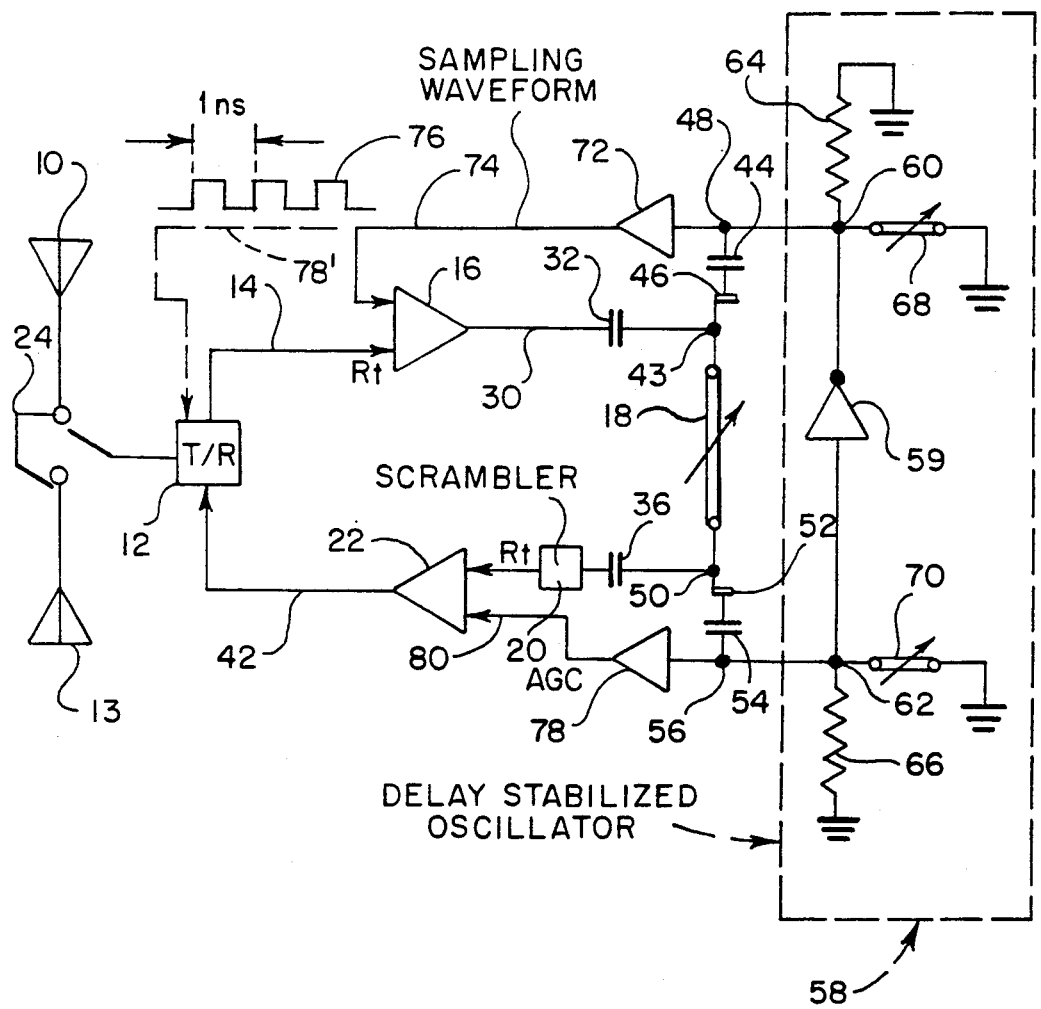
FIG. 2 is an elaborated circuit diagram of the sampling repeater shown in FIG. 1.

FIG. 2 illustrates the present invention in greater detail. Similar components to those shown in FIG. 1 are identically indicated. The single antenna 10 previously discussed in connection with FIG. 1 operates in conjunction with a second antenna 13 so that fore and aft antennas may be employed in a decoy, launched from a host aircraft. A conventional mechanical switch 24 is illustrated for switching in either the fore or aft antenna, depending upon the desired directionality. A signal from either antenna passes through the T/R switch 12 and continues along line 14 as a radio frequency signal to the low noise amplifier 16. The output from the amplifier is connected along lead 30 to a DC blocking capacitor 32 and then undergoes delay in a variable delay line 18. The signal is then passed through a second DC blocking capacitor 36 and is fed to a scrambler 20. The scrambler may be chosen from various conventional designs and selection of a particular scrambler for an anticipated environment is well known to those of skill in the art. The resulting scrambled radio frequency signal is then output from the scrambler 20 into power amplifier 22. The amplifier output is connected along line 42 to a transmit input of the T/R switch 12. The latter-mentioned switch is preferably of the FET type fabricated from GaAs material exhibiting high isolation between transmit and receive terminals. From this point the selected antenna repeats the scrambled signal which will effectively neutralize the homing capability of a launched missile. The wavelength parameter of delay line 18 is $\lambda_s/2$ and the time constant equation is $\tau_s = \frac{1}{2}f_s$.

The foregoing discussion is directed to the basic repeating operation of the circuit. However, it is necessary to sample the incoming signal and this is done with a delay-stabilized oscillator which produces a self-synchronized sampling signal wherein the sampling rate may be randomized (selectable delay). Sampling rates are quite high, preferably in the order of 1 ns. In order to keep such high frequency oscillations from the repeater loop just discussed, high frequency suppression components are employed at each terminal of the delay line 18. Thus, at the upper terminal 43 of delay line 18, serially connected DC blocking capacitor 44 and RF trap coil 46 exist. Similarly, at the lower terminal 50 are capacitor 54 and coil trap 52. The outer terminals of respective capacitors 44 and 54 are indicated by reference numerals 48 and 56. These terminals are connected across a delay-stabilized oscillator generally indicated by reference numeral 58. The oscillator includes a high frequency two-terminal switch 59 of conventional design. Each terminal of the switch is grounded through two parallel branches. Thus, the upper illustrated terminal 60 of switch 59 is grounded through load resistor 64 and a variable short delay line 68 is connected in parallel therewith. The latter-mentioned delay line is characterized by wavelength and time constant parameters $\lambda_s/4$ and $\tau_s/2$. The output from the delay-stabilized oscillator 58 serves as both a sampling waveform and an automatic gain control for a repeated signal power amplifier, as will be explained.

The output from oscillator terminal 60 is fed to a clipping switch 72 so that a square wave sampling waveform is generated along line 74, the waveform being indicated at reference numeral 76. This waveform serves as the second input to the low noise amplifier 16, the first input being the incoming radio frequency signal. The sampling waveform is also used as a synchronization signal, along dotted line 78' which is connected to the synchronization input of the T/R switch 12.

The lower oscillator terminal 62 is also connected to ground through parallel connected resistor 66 and variable short delay line 70 is input to clipping switch 78 and the output from this switch serves as an AGC signal to power amplifier 22. The output from the power amplifier, along line 42, is repeated by an antenna 10, 13 through T/R 12. As previously mentioned, the T/R switch is a high isolation switch which prevents recirculation of input and output repeat signals through the circuit itself so that superior performance may be realized. Further, by synchronizing the T/R switch with the sampling waveform 76, the sampling repeater will successfully alternate between receive and transmit modes at sufficiently high speeds and in synchronism to accomplish the intended result of repeating the incoming signal as a scrambled signal.

Accordingly, the above-described invention presents a sampling repeater which is self-synchronized at a randomized sampling rate. The design of the present invention offers stable operation and dependable performance.

It should be understood that the invention is not limited to the exact details of construction shown and described herein for obvious modifications will occur to persons skilled in the art.

We claim:
1. A sampling repeater comprising:
   means for switching an antenna between transmit and receive modes;
   first amplifying means connected to a receive terminal of the switching means for amplifying a received RF signal;
   means connected to an output of the amplifying means for delaying the amplified output signal;
   signal scrambling means connected to the delaying means output for generating a scrambled received signal;
   second amplifying means connected between the scrambling means output and a transmit terminal of the switching means for transmitting the scrambled signal; and
   oscillator means connected across the delaying means for generating a sampling signal;
   first means connecting the oscillating means output to the first amplifying means for sampling the received RF signal thereat; and
   second means connecting the oscillating means to a control terminal of the switching means for synchronizing its switching operation to the sampling of the received RF signal.

2. The repeater set forth in claim 1 wherein the oscillating means comprises:
   second switching means connected across the delay means;
   two symmetrically connected delay lines, each of which connects a terminal of the second switching means to ground; and
   resistors connected in parallel across each of the symmetrically connected delay lines.

3. The repeater set forth in claim 1 wherein the delay means comprises a delay line.

4. A coherent sampling repeater comprising:
   a transmit/receive switch connected to antenna means;
   a first amplifier connected to a receive terminal of the switch for amplifying a received RF signal;
   a delay line connected to an output of the amplifier means for delaying the amplified output signal;
   a signal scrambler connected to the delay line output for generating a scrambled received signal;
   a second amplifier connected between the scrambler output and a transmitter terminal of the switch for transmitting the scrambled signal;
   an oscillator connected across the delay line for generating a sampling signal;
   a lead connecting the oscillator output to the first amplifier for sampling the received RF signal therethrough;
   a lead connecting the oscillator output to a control terminal of the switch for synchronizing its switching operation to the sampling of the received RF signal; and
   series connected inductor and capacitor components connected between each output of the oscillator and a corresponding end of the delay line for suppressing oscillations in the delay line.

5. The repeater set forth in claim 4 wherein the oscillator comprises:
   a high-speed switch connected across the delay line;
   two symmetrically connected delay lines, each of which connects a terminal of the high-speed switch to ground; and
   resistors connected in parallel across each of the symmetrical delay lines.

* * * * *